US012296862B2

United States Patent
Tamura et al.

(10) Patent No.: US 12,296,862 B2
(45) Date of Patent: May 13, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Sho Tamura, Wako (JP); Yoshihiro Mori, Wako (JP); Takao Tamura, Wako (JP); Daichi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 18/112,528

(22) Filed: Feb. 22, 2023

(65) Prior Publication Data

US 2023/0303126 A1  Sep. 28, 2023

(30) Foreign Application Priority Data

Mar. 25, 2022  (JP) .................. 2022-050640

(51) Int. Cl.
*B60W 60/00* (2020.01)
*B60W 10/06* (2006.01)
(Continued)

(52) U.S. Cl.
CPC ........ *B60W 60/0053* (2020.02); *B60W 10/06* (2013.01); *B60W 10/08* (2013.01);
(Continued)

(58) Field of Classification Search
CPC .. B60W 60/0053; B60W 10/06; B60W 10/08; B60W 10/18; B60W 10/20;
(Continued)

(56) References Cited

U.S. PATENT DOCUMENTS 9,308,914 B1 *  4/2016  Sun ................... B60W 60/0051
10,640,122 B2 *  5/2020  Kishi .................. B60W 50/082
(Continued)

FOREIGN PATENT DOCUMENTS

JP  2019-038289  3/2019
JP  2020-050086  4/2020
(Continued)

OTHER PUBLICATIONS

Japanese Office Action for Japanese Patent Application No. 2022-050640 mailed Oct. 24, 2023.

*Primary Examiner* — Phutthiwat Wongwian
*Assistant Examiner* — Brian R Kirby
(74) *Attorney, Agent, or Firm* — Amin, Turocy & Watson, LLP

(57) ABSTRACT

A vehicle control device acquires a camera image obtained by capturing an image of surrounding circumstances of a vehicle, controls steering and acceleration/deceleration of the vehicle without depending on an operation of a driver of the vehicle on the basis of the camera image and map information, determines any of a plurality of driving modes including a first driving mode and a second driving mode as a driving mode of the vehicle, judges whether or not a preceding vehicle is present in front of the vehicle when it is judged that an abnormality has occurred, calculates, when it is judged that the preceding vehicle is present, a margin for the vehicle to continue traveling in the second driving mode, and causes the vehicle to continue traveling in the second driving mode for a period of time indicated based on the margin.

10 Claims, 7 Drawing Sheets

(51) Int. Cl.
*B60W 10/08* (2006.01)
*B60W 10/18* (2012.01)
*B60W 10/20* (2006.01)
*B60W 30/12* (2020.01)
*B60W 30/14* (2006.01)
*B60W 30/16* (2020.01)
*B60W 30/165* (2020.01)
*B60W 50/02* (2012.01)

(52) U.S. Cl.
CPC ............ *B60W 10/18* (2013.01); *B60W 10/20* (2013.01); *B60W 30/12* (2013.01); *B60W 30/16* (2013.01); *B60W 30/165* (2013.01); *B60W 50/0205* (2013.01); *B60W 60/0051* (2020.02); *B60W 60/0059* (2020.02); *B60W 30/143* (2013.01); *B60W 2420/403* (2013.01); *B60W 2552/53* (2020.02)

(58) Field of Classification Search
CPC ......... B60W 50/0205; B60W 60/0051; B60W 60/0059; B60W 30/12; B60W 30/143; B60W 2420/403; B60W 2552/53
See application file for complete search history.

(56) References Cited

U.S. PATENT DOCUMENTS

| | | | |
|---|---|---|---|
| 2015/0151757 A1* | 6/2015 | De Bruin | B60W 30/16 701/41 |
| 2015/0241878 A1* | 8/2015 | Crombez | B60W 60/00184 701/23 |
| 2016/0214612 A1* | 7/2016 | Kashiba | B60W 60/0053 |
| 2017/0028995 A1* | 2/2017 | Mori | B60W 60/0053 |
| 2017/0203770 A1* | 7/2017 | Kondo | B60W 50/14 |
| 2017/0313319 A1* | 11/2017 | Kishi | B60W 10/04 |
| 2018/0039268 A1* | 2/2018 | Mangal | B60W 60/0051 |
| 2019/0049972 A1* | 2/2019 | Prasad | G05D 1/0257 |
| 2019/0101916 A1* | 4/2019 | Sen | B60W 60/0055 |
| 2019/0111922 A1* | 4/2019 | Nath | G06V 20/588 |
| 2019/0129417 A1* | 5/2019 | Noto | B60W 60/0053 |
| 2019/0138002 A1 | 5/2019 | Mimura et al. | |
| 2020/0183411 A1* | 6/2020 | Oba | B60W 60/0057 |
| 2020/0264606 A1* | 8/2020 | Kuwahara | B60W 60/007 |
| 2021/0291830 A1 | 9/2021 | Tamura | |
| 2022/0067398 A1 | 3/2022 | Tamura et al. | |
| 2022/0219692 A1 | 7/2022 | Taniguchi | |

FOREIGN PATENT DOCUMENTS

| | | | |
|---|---|---|---|
| JP | 2021-149321 | 9/2021 | |
| JP | 2022-039951 | 3/2022 | |
| WO | WO-2017056224 A1 * | 4/2017 | ............ B60K 35/00 |
| WO | WO-2017169386 A1 * | 10/2017 | ........... A61B 5/0077 |
| WO | 2017/187622 | 11/2017 | |
| WO | 2020/230551 | 11/2020 | |
| WO | 2021/033312 | 2/2021 | |

* cited by examiner

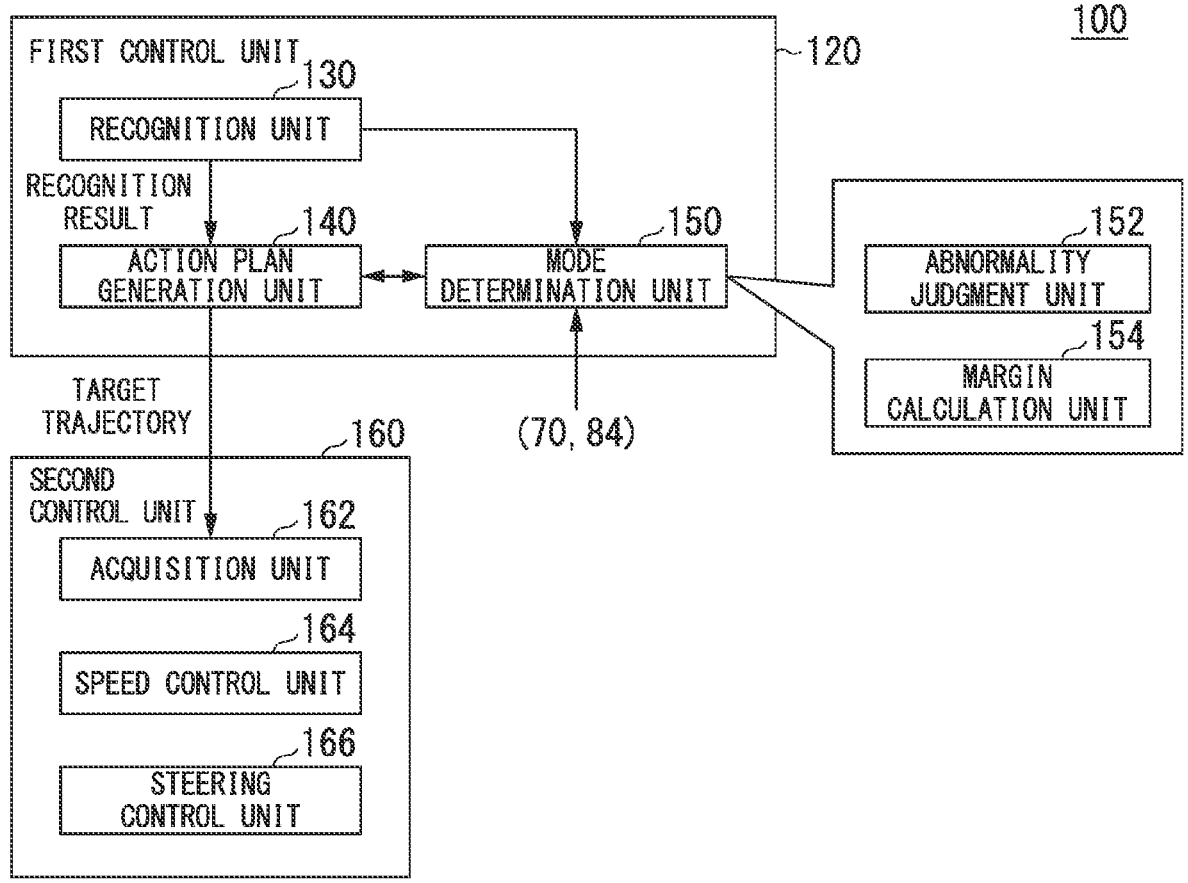

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-050640, filed Mar. 25, 2022, the content of which is incorporated herein by reference.

BACKGROUND

Field of the Invention

The present invention relates to a vehicle control device, a vehicle control method, and a storage medium.

Description of Related Art

In the related art, a technology of controlling traveling of a host vehicle on the basis of a road demarcation line recognized using a camera mounted on a vehicle is known. For example, Japanese Unexamined Patent Application, First Publication No. 2020-050086 discloses a technology of causing a host vehicle to travel on the basis of recognized road demarcation lines and causing the host vehicle to travel on the basis of a trajectory of a preceding vehicle when a degree of recognition of the road demarcation line does not satisfy a predetermined criterion.

In the technology disclosed in Patent Document 1, traveling of the host vehicle is controlled on the basis of a road demarcation line recognized using a camera and map information loaded onto the host vehicle. However, in the technology in the related art, when a road demarcation line recognized using the camera differ from details of the map information loaded onto the host vehicle, driving control of the vehicle may not be able to be flexibly changed.

SUMMARY

The present invention has been made in consideration of such circumstances, and an object thereof is to provide a vehicle control device, a vehicle control method, and a storage medium capable of flexibly changing driving control of a host vehicle even when a road demarcation line recognized using a camera differ from details of map information loaded onto the vehicle.

A vehicle control device, a vehicle control method, and a storage medium according to this invention employ the following constitutions.

(1): According to an aspect of this invention, there is provided a vehicle control device including a storage medium which stores a command able to be read by a computer, and at least one processor which is connected to the storage medium. At least the one processor, by executing a command able to be read by the computer, acquires a camera image obtained by capturing an image of surrounding circumstances of a vehicle; controls steering and acceleration/deceleration of the vehicle without depending on an operation of a driver of the vehicle on the basis of the camera image and map information; determines any of a plurality of driving modes including a first driving mode and a second driving mode as a driving mode of the vehicle, and changes the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle; judges whether or not an abnormality has occurred in road demarcation lines indicated in the camera image or road demarcation lines indicated in the map information, and judges whether or not a preceding vehicle is present in front of the vehicle when it is judged that the abnormality has occurred; calculates, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle; and causes the vehicle to continue traveling in the second driving mode for a period of time indicated based on the margin.

(2): In the aspect of the foregoing (1), when it is judged as the abnormality that a discrepancy is present on both sides of the road demarcation lines indicated in the camera image and the road demarcation lines indicated in the map information, at least the one processor causes traveling in the second driving mode to continue for a period of time indicated based on the margin and changes the second driving mode to the first driving mode after the period of time has elapsed using the road demarcation lines indicated in the camera image as reference lines.

(3): In the aspect of the foregoing (1), when it is judged as the abnormality that a discrepancy is present on both sides of the road demarcation lines indicated in the camera image and the road demarcation lines indicated in the map information, at least the one processor judges whether or not a state in which the road demarcation lines on both sides indicated in the camera image are discrepant from the road demarcation lines on both sides indicated in the map information at the same angle and a curvature change rate equal to or larger than a threshold continues for a predetermined period of time. When it is judged that the state continues for a predetermined period of time, it is judged that there is misrecognition in the road demarcation lines indicated in the camera image. When it is judged that there is misrecognition in the road demarcation lines indicated in the camera image, the second driving mode is changed to the first driving mode using the road demarcation lines indicated in the map information.

(4): In the aspect of the foregoing (1), when it is judged as the abnormality that a discrepancy is present on only one of the road demarcation lines indicated in the camera image and the road demarcation lines indicated in the map information, at least the one processor causes traveling in the second driving mode to continue using the road demarcation line in which the discrepancy has not occurred as a reference line.

(5): In the aspect of the foregoing (1), when it is judged as the abnormality that the discrepancy has occurred due to disappearance of both sides of the road demarcation lines indicated in the camera image, at least the one processor causes traveling in the second driving mode to continue for a period of time indicated based on the margin and changes the second driving mode to manual driving in stages via the first driving mode after the period of time has elapsed using the road demarcation lines indicated in the map information as reference lines.

(6): In the aspect of the foregoing (1), when it is judged as the abnormality that misrecognition has occurred due to disappearance of one of the road demarcation lines indicated in the camera image and a discrepancy in the other of the road demarcation lines indicated in the camera image, at least the one processor causes traveling in the second driving mode to continue for a period of time indicated based on the margin and changes the second driving mode to manual driving in stages via the first driving mode after the period of time has elapsed using the road demarcation lines indicated in the map information as reference lines.

(7): In the aspect of the foregoing (1), the second driving mode is a driving mode in which a task of grasping an operation piece receiving a steering operation of the vehicle is not imposed on the driver. The first driving mode is a driving mode in which at least only the task of grasping the operation piece is imposed on the driver.

(8): According to another aspect of this invention, there is provided a vehicle control method, in which a computer acquires a camera image obtained by capturing an image of surrounding circumstances of a vehicle; controls steering and acceleration/deceleration of the vehicle without depending on an operation of a driver of the vehicle on the basis of the camera image and map information; determines any of a plurality of driving modes including a first driving mode and a second driving mode as a driving mode of the vehicle, and changes the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle; judges whether or not an abnormality has occurred in road demarcation lines indicated in the camera image or road demarcation lines indicated in the map information, and judges whether or not a preceding vehicle is present in front of the vehicle when it is judged that the abnormality has occurred; calculates, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle; and causes the vehicle to continue traveling in the second driving mode for a period of time indicated based on the margin.

(9): According to another aspect of this invention, there is provided a computer readable non-transitory storage medium storing a program for causing a computer to acquire a camera image obtained by capturing an image of surrounding circumstances of a vehicle; to control steering and acceleration/deceleration of the vehicle without depending on an operation of a driver of the vehicle on the basis of the camera image and map information; to determine any of a plurality of driving modes including a first driving mode and a second driving mode as a driving mode of the vehicle, and changes the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle; to judge whether or not an abnormality has occurred in road demarcation lines indicated in the camera image or road demarcation lines indicated in the map information, and judge whether or not a preceding vehicle is present in front of the vehicle when it is judged that the abnormality has occurred; to calculate, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle; and to cause the vehicle to continue traveling in the second driving mode for a period of time indicated based on the margin.

According to (1) to (9), it is possible to flexibly change driving control of a host vehicle even when a road demarcation line recognized using a camera differ from details of map information loaded onto the vehicle.

BRIEF DESCRIPTION OF THE DRAWINGS

FIG. 2 is a view of a functional constitution of a first control unit and a second control unit.

FIG. 3 is a view illustrating an example of correspondences of driving modes, control states of a host vehicle, and tasks.

DESCRIPTION OF EMBODIMENT

Hereinafter, with reference to the drawings, an embodiment of a vehicle control device, a vehicle control method, and a storage medium of the present invention will be described.

[Overall Constitution]

Figure 1:
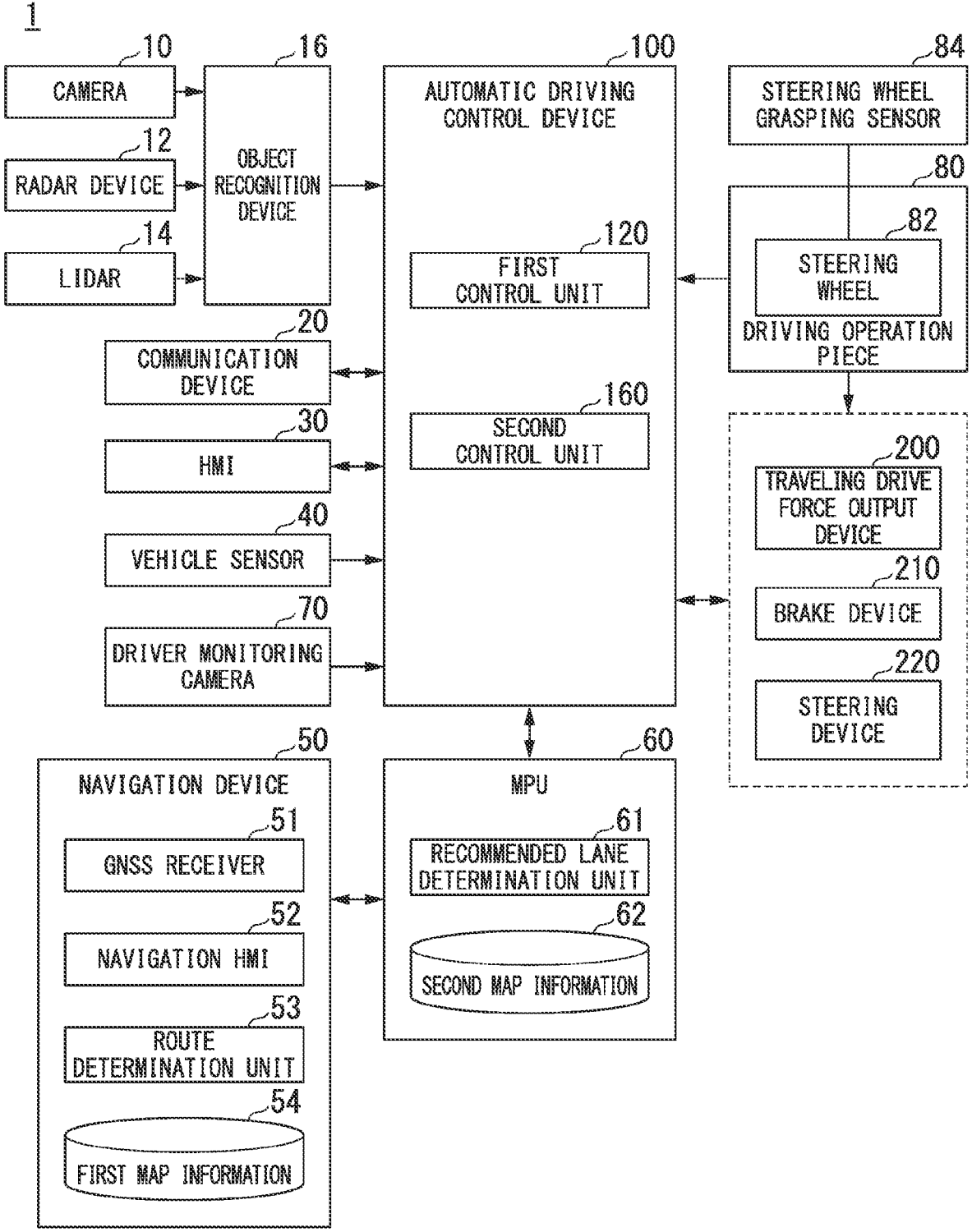
FIG. 1 is a view of a constitution of a vehicle system utilizing a vehicle control device according to an embodiment.

FIG. 1 is a view of a constitution of a vehicle system 1 utilizing a vehicle control device according to an embodiment. For example, a vehicle loaded with the vehicle system 1 is a vehicle having two wheels, three wheels, or four wheels, and a drive source thereof is an internal-combustion engine such as a diesel engine or a gasoline engine, an electric motor, or a combination of these. An electric motor operates using power generated by a generator interlinked to the internal-combustion engine, or discharge power of a secondary battery or a fuel cell.

For example, the vehicle system 1 includes a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitoring camera 70, a driving operation piece 80, an automatic driving control device 100, a traveling drive force output device 200, a brake device 210, and a steering device 220. These devices and instruments are connected to each other through a multiplex communication line such as a controller area network (CAN) communication line, a serial communication line, a radio communication network, or the like. The constitution illustrated in FIG. 1 is merely an example. A part of the constitution may be omitted, or another constitution may be added thereto.

For example, the camera 10 is a digital camera utilizing a solid-state imaging element such as a charge coupled device (CCD) or a complementary metal oxide semiconductor (CMOS). The camera 10 is attached to an arbitrary part in the vehicle loaded with the vehicle system 1 (hereinafter, a host vehicle M). When an image of the side in front thereof is captured, the camera 10 is attached to an upper portion in a front windshield, a rear surface of a rearview mirror, or the like. For example, the camera 10 periodically and repeatedly captures images of an area around the host vehicle M. The camera 10 may be a stereo camera.

The radar device 12 radiates radio waves such as millimeter waves in the area around the host vehicle M and detects at least a position of an object (a distance and an azimuth) by detecting radio waves (reflected waves) reflected by the object. The radar device 12 is attached to an arbitrary part in the host vehicle M. The radar device 12 may detect a position and a speed of an object by a frequency modulated continuous wave (FM-CW) method.

The LIDAR 14 emits light (or electromagnetic waves having wavelengths close to that of light) to the area around the host vehicle M and measures scattered light. The LIDAR 14 detects a distance to a target on the basis of a time from light emission to light reception. For example, emitted light is pulsed laser light. The LIDAR 14 is attached to an arbitrary part in the host vehicle M.

The object recognition device 16 recognizes a position, a kind, a speed, and the like of an object by performing sensor fusion processing with respect to detection results of some or all of the camera 10, the radar device 12, and the LIDAR 14. The object recognition device 16 outputs recognition results to the automatic driving control device 100. The object recognition device 16 may output to detection results of the camera 10, the radar device 12, and the LIDAR 14 to the automatic driving control device 100 without any change. The object recognition device 16 may be omitted from the vehicle system 1.

For example, the communication device 20 communicates with other vehicles present in the area around the host vehicle M utilizing a cellular network, a Wi-Fi network, Bluetooth (registered trademark), dedicated short range communication (DSRC), or the like, or communicates with various server devices via radio base stations.

The HMI 30 presents various kinds of information to an occupant of the host vehicle M and receives an input operation performed by the occupant. The HMI 30 includes various display devices, a speaker, a buzzer, a touch panel, a switch, a key, and the like.

The vehicle sensor 40 includes a vehicle speed sensor for detecting a speed of the host vehicle M, an acceleration sensor for detecting an acceleration, a yaw rate sensor for detecting an angular velocity around a vertical axis, an azimuth sensor for detecting a direction of the host vehicle M, and the like.

For example, the navigation device 50 includes a global navigation satellite system (GNSS) receiver 51, a navigation HMI 52, and a route determination unit 53. The navigation device 50 retains first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) utilizing an output of the vehicle sensor 40. The navigation HMI 52 includes a display device, a speaker, a touch panel, a key, and the like. A part or the entirety of the navigation HMI 52 may be shared as the HMI 30 described above. For example, with reference to the first map information 54, the route determination unit 53 determines a route from the position of the host vehicle M (or an arbitrary input position) identified by the GNSS receiver 51 to a destination input by the occupant using the navigation HMI 52 (hereinafter, a route on the map). For example, the first map information 54 is information in which road shapes are expressed by links indicating roads and nodes connected to each other by the links. The first map information 54 may include curvatures of roads, point of interest (POI) information, and the like. The route on the map is output to the MPU 60. The navigation device 50 may guide a route using the navigation HMI 52 on the basis of the route on the map. For example, the navigation device 50 may be realized by a function of a terminal device such as a smartphone or a tablet terminal carried by an occupant. The navigation device 50 may transmit a current position and a destination to a navigation server via the communication device 20 and acquire a route equivalent to the route on the map from a navigation server.

For example, the MPU 60 includes a recommended lane determination unit 61 and retains second map information 62 in a storage device such as an HDD or a flash memory. The recommended lane determination unit 61 divides a route on the map provided from the navigation device 50 into a plurality of blocks (for example, divides a route on the map by 100 [m] in a vehicle forward traveling direction) and determines a recommended lane for each block with reference to the second map information 62. The recommended lane determination unit 61 determines which lane to travel from the left. When a branch point is present in the route on the map, the recommended lane determination unit 61 determines a recommended lane such that the host vehicle M can travel in a reasonable route for traveling forward to a branch location.

The second map information 62 is more detailed map information than the first map information 54. For example, the second map information 62 includes information of the center of a lane, information of the boundary of a lane, and the like. In addition, the second map information 62 may include road information, traffic regulation information, address information (addresses and zip codes), facility information, phone number information, information of prohibited sections in which a mode A or a mode B (which will be described below) is prohibited, and the like. The second map information 62 may be updated at any time by the communication device 20 through communication with other devices.

For example, the driver monitoring camera 70 is a digital camera utilizing a solid-state imaging element such as a CCD or a CMOS. The driver monitoring camera 70 is attached to an arbitrary part in the host vehicle M in a position and a direction in which an image of the head of an occupant (hereinafter, a driver) seated in a driver's seat of the host vehicle M can be captured from the front (in a direction in which an image of the face is captured). For example, the driver monitoring camera 70 is attached to an upper portion of the display device provided in a central portion of an instrument panel of the host vehicle M.

For example, in addition to a steering wheel 82, the driving operation piece 80 includes an accelerator pedal, a brake pedal, a shift lever, and other operation pieces. A sensor for detecting an operation amount or the presence or absence of an operation is attached to the driving operation piece 80, and detection results thereof are output to some or all of the automatic driving control device 100, the traveling drive force output device 200, the brake device 210, and the steering device 220. The steering wheel 82 is an example of "an operation piece receiving a steering operation performed by the driver". The operation piece does not necessarily have an annular shape and may be formed as a steering wheel having a different shape, a joystick, a button, or the like. A steering wheel grasping sensor 84 is attached to the steering wheel 82. The steering wheel grasping sensor 84 is realized by an electrostatic capacity sensor or the like and outputs a signal capable of detecting whether or not the driver is grasping the steering wheel 82 (is in contact with the steering wheel 82 in a state in which a force can be applied thereto) to the automatic driving control device 100.

For example, the automatic driving control device 100 includes a first control unit 120 and a second control unit 160. For example, each of the first control unit 120 and the second control unit 160 is realized by a hardware processor such as a central processing unit (CPU) executing a program (software). In addition, some or all of these constituent elements may be realized by hardware (a circuit; including circuitry) such as a large scale integration (LSI), an application specific integrated circuit (ASIC), a field-programmable gate array (FPGA), or a graphics processing unit (GPU), or may be realized by software and hardware in cooperation. A program may be stored in a storage device such as an HDD or a flash memory (a storage device including a non-transitory storage medium) of the automatic driving control device 100 in advance or may be stored in an attachable/detachable storage medium such as a DVD or a CD-ROM such that the program is installed in the HDD or the flash memory of the automatic driving control device 100 when the storage medium (non-transitory storage medium) is mounted in a drive device. The automatic driving control device 100 is an example of "a vehicle control device", and a combination of an action plan generation unit 140 and the second control unit 160 is an example of "a driving control unit".

FIG. 2 is a view of a functional constitution of the first control unit 120 and the second control unit 160. For example, the first control unit 120 includes a recognition unit 130, the action plan generation unit 140, and a mode determination unit 150. For example, the first control unit 120 realizes a function based on artificial intelligence (AI) and a function based on a model given in advance in parallel. For example, the function of "recognition of an intersection" may be realized by executing recognition of an intersection based on deep learning or the like and recognition based on conditions given in advance (including signals allowing pattern matching, road signs, and the like) in parallel and scoring both for comprehensive evaluation. Accordingly, the reliability of automatic driving is secured.

The recognition unit 130 recognizes states of the position, the speed, the acceleration, and the like of an object in the area around the host vehicle M on the basis of the information input from the camera 10, the radar device 12, and the LIDAR 14 via the object recognition device 16. For example, the position of an object is recognized as a position on absolute coordinates having a representative point (the center of gravity, the center of a drive shaft, or the like) of the host vehicle M as an origin and is used for control. The position of an object may be expressed by a representative point of the center of gravity of the object, a corner, or the like or may be expressed by a region. A "state" of an object may include an acceleration or a jerk of the object, or "an action state" (for example, whether or not a lane change is performed or attempted).

In addition, for example, the recognition unit 130 recognizes a lane in which the host vehicle M is traveling (traveling lane). For example, the recognition unit 130 recognizes a traveling lane by comparing a pattern of road demarcation lines obtained from the second map information 62 (for example, an array of solid lines and dotted lines) with a pattern of road demarcation lines in the area around the host vehicle M recognized from an image captured by the camera 10. The recognition unit 130 may recognize a traveling lane by recognizing a course boundary (road boundary) including road demarcation lines, shoulders of a road, curbstones, median strips, guardrails, and the like, without being limited to road demarcation lines. In this recognition, the position of the host vehicle M acquired from the navigation device 50 or processing results of the INS may be added. In addition, the recognition unit 130 recognizes stop signs, obstacles, red signals, tollgates, and other road events.

When a traveling lane is recognized, the recognition unit 130 recognizes a position or a posture of the host vehicle M with respect to the traveling lane. For example, the recognition unit 130 may recognize a discrepancy of a reference point in the host vehicle M from the center of the lane and an angle formed with respect to a line obtained by connecting the centers of the lane in the forward traveling direction of the host vehicle M as a relative position and a posture of the host vehicle M with respect to the traveling lane. In place of this, the recognition unit 130 may recognize the position of the reference point in the host vehicle M or the like with respect to any side end portion of the traveling lane (a road demarcation line or a road boundary) as a relative position of the host vehicle M with respect to the traveling lane. The recognition unit 130 is an example of "an acquisition unit".

In principle, the action plan generation unit 140 generates a target trajectory in which the host vehicle M will automatically travel (without depending on an operation of the driver) in the future such that the host vehicle M travels in a recommended lane determined by the recommended lane determination unit 61 and can also cope with surrounding circumstances of the host vehicle M. For example, a target trajectory includes a speed factor. For example, a target trajectory is expressed as arrival target spots (trajectory points) of the host vehicle M arranged in order. Trajectory points are arrival target spots of the host vehicle M for each predetermined traveling distance (for example, approximately several meters) by a distance along the road. In addition to this, a target speed and a target acceleration for each predetermined sampling time (for example, approximately several tenths of a second) are generated as a part of the target trajectory. In addition, the trajectory points may be arrival target positions of the host vehicle M at corresponding sampling times of respective predetermined sampling times. In this case, information of the target speed and the target acceleration is expressed by an interval between the trajectory points.

When a target trajectory is generated, the action plan generation unit 140 may set an event of automatic driving. An event of automatic driving includes a constant speed traveling event, a low speed following traveling event, a lane change event, a branching event, a merging event, a takeover event, and the like. The action plan generation unit 140 generates a target trajectory corresponding to a started event.

The mode determination unit 150 determines any of a plurality of driving modes having different tasks imposed on the driver as a driving mode of the host vehicle M. For example, the mode determination unit 150 includes an abnormality judgment unit 152 and a margin calculation unit 154. Individual functions thereof will be described below.

FIG. 3 is a view illustrating an example of correspondences of driving modes, control states of the host vehicle M, and tasks. For example, regarding the driving mode of the host vehicle M, there are five modes including a mode A to a mode E. The control state, that is, a degree of automation in driving control of the host vehicle M is the highest in the mode A, sequentially becomes lower in the of order the mode B, the mode C, and the mode D, and is the lowest in the mode E. On the contrary, tasks imposed on the driver are the lightest in the mode A, sequentially become heavier in the order of the mode B, the mode C, and the mode D, and are the lightest in the mode E. In the modes D and E, since the control state is not automatic driving, the automatic driving control device 100 has a duty of ending control related to automatic driving and shifting to driving assistance or manual driving. Hereinafter, details of each of the driving modes will be described as an example.

In the mode A, the host vehicle M is in the automatic driving state, and both front side monitoring and grasping of the steering wheel 82 (in the diagram, steering wheel grasping) are not imposed on the driver. However, even in the mode A, the driver is required to be in a posture capable of quickly shifting to manual driving in response to a request from the system centered on the automatic driving control device 100. The aforementioned automatic driving denotes that both steering and acceleration/deceleration are controlled without depending on an operation of the driver. The front side denotes a space visually recognized in the forward traveling direction of the host vehicle M via the front windshield. For example, the mode A is a driving mode which can be executed on a motorway such as an expressway when the host vehicle M is traveling at a predetermined speed (for example, approximately 50 [km/h]) or slower and conditions such as a preceding vehicle (following target) being present are satisfied, and it may also be referred to as a traffic jam pilot (TJP). When the conditions are no longer satisfied, the mode determination unit 150 changes the driving mode of the host vehicle M to the mode B.

In the mode B, the host vehicle M is in the driving assistance state, and a task of monitoring the side in front of the host vehicle M (hereinafter, front side monitoring) is imposed on the driver, but a task of grasping the steering wheel 82 is not imposed. In the mode C, the host vehicle M is in the driving assistance state, and the task of monitoring the side in front thereof and the task of grasping the steering wheel 82 are imposed on the driver. The mode D is a driving mode requiring a driving operation by the driver to a certain extent regarding at least one of steering and acceleration/deceleration of the host vehicle M. For example, in the mode D, driving assistance such as adaptive cruise control (ACC) or a lane keeping assist system (LKAS) is performed. In the mode E, the host vehicle M is in a manual driving state requiring a driving operation by the driver for both steering and acceleration/deceleration. In both the mode D and the mode E, as a matter of course, the task of monitoring the side in front of the host vehicle M is imposed on the driver.

The automatic driving control device 100 (and a driving assistance device (not illustrated)) executes automatic lane change corresponding to the driving mode. Automatic lane change includes automatic lane change (1) based on a request of the system, and automatic lane change (2) based on a request of the driver. The automatic lane change (1) includes automatic lane change for passing performed when the speed of a preceding vehicle is lower than a criterion compared to the speed of the host vehicle, and automatic lane change for travelling forward toward a destination (automatic lane change based on change of a recommended lane). In the automatic lane change (2), lane change of the host vehicle M is performed in an operation direction when a direction indicator is operated by the driver in a case in which conditions related to the speed, the positional relationship with respect to surrounding vehicles, and the like are satisfied.

In the mode A, the automatic driving control device 100 executes neither of the automatic lane changes (1) and (2). In the modes B and C, the automatic driving control device 100 executes both the automatic lane changes (1) and (2). In the mode D, the driving assistance device (not illustrated) does not execute the automatic lane change (1) but executes the automatic lane change (2). In the mode E, both the automatic lane changes (1) and (2) are not executed.

When tasks related to a determined driving mode (hereinafter, a current driving mode) are not being executed by the driver, the mode determination unit 150 changes the driving mode of the host vehicle M to a driving mode imposing heavier tasks.

For example, in the mode A, when the driver is in a posture in which the driver cannot shift to manual driving in response to a request from the system (for example, when the driver continues an action of looking aside other than at an allowable area or when a sign indicating difficulty in performing driving is detected), the mode determination unit 150 prompts the driver to shift to manual driving using the HMI 30. If the driver does not comply therewith, the mode determination unit 150 performs control such as pulling over the host vehicle M to a shoulder of the road, gradually stopping the host vehicle M, and stopping the automatic driving. After automatic driving is stopped, the host vehicle is in a state of the mode D or E, and the host vehicle M can be started by a manual operation of the driver. Thereafter, the same applies to "stopping automatic driving". In the mode B, when the driver is not monitoring the side in front thereof, the mode determination unit 150 prompts the driver to monitor the side in front thereof using the HMI 30. If the driver does not comply therewith, the mode determination unit 150 performs control such as pulling over the host vehicle M to a shoulder of the road, gradually stopping the host vehicle M, and stopping the automatic driving. In the mode C, when the driver is not monitoring the side in front thereof, or when the steering wheel 82 is not grasped, the mode determination unit 150 prompts the driver to monitor the side in front thereof using the HMI 30, and/or to grasp the steering wheel 82. If the driver does not comply therewith, the mode determination unit 150 performs control such as pulling over the host vehicle M to a shoulder of the road, gradually stopping the host vehicle M, and stopping the automatic driving.

The second control unit 160 controls the traveling drive force output device 200, the brake device 210, and the steering device 220 such that the host vehicle M passes along a target trajectory generated by the action plan generation unit 140 as scheduled.

Returning to FIG. 2, for example, the second control unit 160 includes an acquisition unit 162, a speed control unit 164, and a steering control unit 166. The acquisition unit 162 acquires information of a target trajectory (trajectory points) generated by the action plan generation unit 140 and stores it in a memory (not illustrated). The speed control unit 164 controls the traveling drive force output device 200 or the brake device 210 on the basis of the speed factor associated with the target trajectory stored in the memory. The steering control unit 166 controls the steering device 220 in accordance with a curve state of the target trajectory stored in the memory. For example, the processing of the speed control unit 164 and the steering control unit 166 is realized by a combination of feedforward control and feedback control. As an example, the steering control unit 166 executes feedforward control in accordance with the curvature of the road in front of the host vehicle M and feedback control based on a discrepancy from the target trajectory in combination.

The traveling drive force output device 200 outputs a traveling drive force (torque) allowing the vehicle to travel to drive wheels. For example, the traveling drive force output device 200 includes a combination of an internal-combustion engine, an electric motor, a transmission, and the like, and an electronic control unit (ECU) for controlling these. The ECU controls the foregoing constituents in accordance with information input from the second control unit 160 or information input from the driving operation piece 80.

For example, the brake device 210 includes a brake caliper, a cylinder transmitting a hydraulic pressure to the brake caliper, an electric motor causing the cylinder to generate a hydraulic pressure, and a brake ECU. The brake ECU controls the electric motor in accordance with the information input from the second control unit 160 or the information input from the driving operation piece 80 such that a brake torque corresponding to a brake operation is output to each wheel. The brake device 210 may include a mechanism, as a backup, in which a hydraulic pressure generated by an operation of the brake pedal included in the driving operation piece 80 is transmitted to the cylinder via a master cylinder. The brake device 210 is not limited to the constitution described above and may be an electronic control hydraulic brake device in which an actuator is controlled in accordance with the information input from the second control unit 160 and a hydraulic pressure of the master cylinder is transmitted to the cylinder.

For example, the steering device 220 includes a steering wheel ECU and an electric motor. For example, the electric motor changes the direction of the steering wheel by causing a force to act by a rack-and-pinion mechanism. The steering wheel ECU changes the direction of the steering wheel by driving the electric motor in accordance with the information input from the second control unit 160 or the information input from the driving operation piece 80.

[Operation of Vehicle Control Device]

Figure 4:
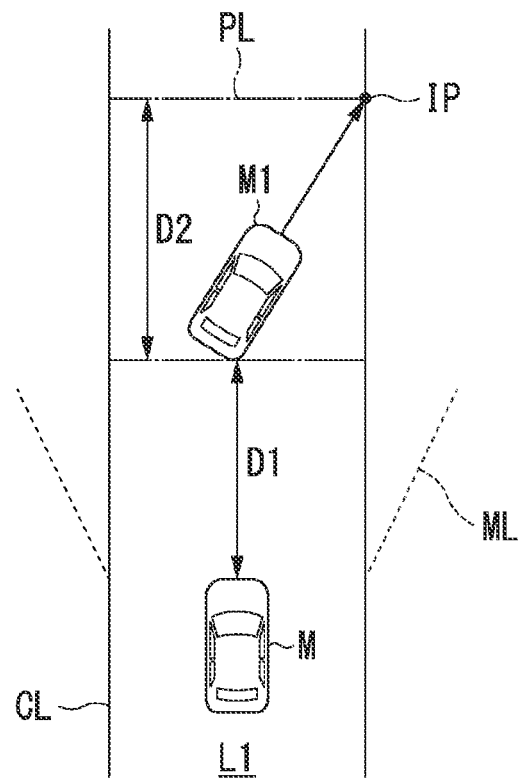
FIG. 4 is a view illustrating an example of a scene in which operation of the vehicle control device according to the embodiment is executed.

Next, operation of the vehicle control device according to the embodiment will be described. The following description is given on the premise that the host vehicle M is traveling in the driving mode of the mode B. FIG. 4 is a view illustrating an example of a scene in which operation of the vehicle control device according to the embodiment is executed. In FIG. 4, the host vehicle M is traveling in a lane L1, and a preceding vehicle M1 is traveling in front of the host vehicle M. While the host vehicle M is traveling in the lane L1, the recognition unit 130 recognizes surrounding circumstances of the host vehicle M, particularly, road demarcation lines on both sides of the host vehicle M on the basis of an image captured by the camera 10. Hereinafter, road demarcation lines recognized on the basis of an image captured by the camera 10 are indicated by CL (which will hereinafter be referred to as "camera road demarcation lines CL"), and road demarcation lines recognized on the basis of the second map information 62 are indicated by ML (which will hereinafter be referred to as "map road demarcation lines ML").

The abnormality judgment unit 152 judges whether or not an abnormality has occurred in the camera road demarcation lines CL or the map road demarcation lines ML, and judges whether or not a preceding vehicle is present in front of the host vehicle M when it is judged that an abnormality has occurred. Here, an abnormality denotes a discrepancy being present between the camera road demarcation lines CL and the map road demarcation lines ML, or disappearance (omission) of the camera road demarcation lines CL due to a flaw of the camera 10 or an external environment (backlight or the like). For example, the abnormality judgment unit 152 judges that a discrepancy is present when the distance between the camera road demarcation lines CL and the map road demarcation lines ML is equal to or larger than a predetermined value, or when an angle formed by the camera road demarcation lines CL and the map road demarcation lines ML is equal to or larger than a predetermined value. When it is judged that an abnormality has occurred in the camera road demarcation lines CL or the map road demarcation lines ML, next, the abnormality judgment unit 152 judges whether or not the preceding vehicle M1 is present within a predetermined distance from the host vehicle M.

When it is judged that the preceding vehicle M1 is present within a predetermined distance from the host vehicle M, the margin calculation unit 154 calculates a margin for the host vehicle M to continue traveling in the driving mode of the mode B on the basis of the distance from the host vehicle M to the preceding vehicle M1, the distance from the preceding vehicle M1 to where the preceding vehicle M1 intersects the camera road demarcation line CL or the map road demarcation line ML, and the speed of the host vehicle M. The mode determination unit 150 causes the host vehicle M to continue traveling in the driving mode of the mode B in accordance with the margin calculated by the margin calculation unit 154.

More specifically, for example, in the case of the scene illustrated in FIG. 4, the abnormality judgment unit 152 judges that a discrepancy has occurred on both sides of the camera road demarcation lines CL and the map road demarcation lines ML (that is, both the road demarcation line on the left side and the road demarcation line on the right side). Generally, it is assumed that the reliability of the camera road demarcation lines CL is higher than that of the map road demarcation lines ML. Therefore, in this case, the margin calculation unit 154 calculates a margin preferentially using the camera road demarcation lines CL.

The margin calculation unit 154 first identifies an intersection point IP between an extended line of a trajectory of the preceding vehicle M1 and the camera road demarcation line CL. Next, the margin calculation unit 154 calculates a margin P using P=(D1+D2)/V [sec] on the basis of a distance D1 from the host vehicle M to the preceding vehicle M1, a distance D2 from the preceding vehicle M1 to a line PL (a line which passes through the intersection point IP and is perpendicular to the camera road demarcation lines CL), and a speed V of the host vehicle M. That is, the margin P indicates a period of time during which the host vehicle M can afford to continue the driving mode of the mode B to at least the line PL.

The mode determination unit 150 causes the host vehicle M to continue traveling in the driving mode of the mode B for the period of time indicated based on the margin P using the camera road demarcation lines CL as reference lines. When the host vehicle M has continued traveling in the driving mode of the mode B for the period of time indicated based on the margin P, the mode determination unit 150 changes the driving mode from the mode B to the mode C.

Figure 5:
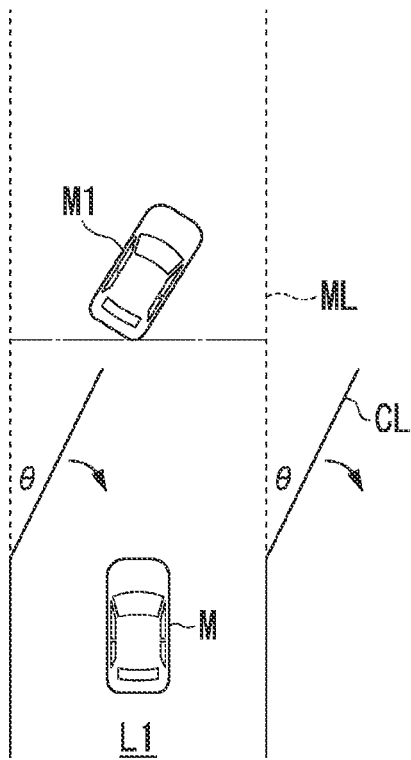
FIG. 5 is a view illustrating another example of a scene in which operation of the vehicle control device according to the embodiment is executed.

FIG. 5 is a view illustrating another example of a scene in which operation of the vehicle control device according to the embodiment is executed. Similar to the scene in FIG. 4, in the scene in FIG. 5, the abnormality judgment unit 152 judges that a discrepancy has occurred on both sides of the camera road demarcation lines CL and the map road demarcation lines ML. At this time, the abnormality judgment unit 152 further judges whether or not a state in which the camera road demarcation lines CL on both sides are discrepant from the map road demarcation lines ML at the same angle and a curvature change rate equal to or larger than a threshold continues for a predetermined period of time.

When it is judged that a state in which the camera road demarcation lines CL on both sides are discrepant from the map road demarcation lines ML at the same angle and a curvature change rate equal to or larger than a threshold continues for a predetermined period of time, the mode determination unit 150 judges that there is misrecognition in the camera road demarcation lines CL. In this case, the mode determination unit 150 changes the driving mode of the mode B to the driving mode of the mode C having the map road demarcation lines ML as the reference lines. At this time, the mode determination unit 150 may temporarily continue the driving mode of the mode B (for example, to the line PL) while having the map road demarcation lines ML as the reference lines. However, generally, it is assumed that the reliability of the map road demarcation lines ML is lower than the reliability of the camera road demarcation lines CL. Therefore, compared to the case in FIG. 4, the driving mode of the mode B having the map road demarcation lines ML as the reference lines is caused to continue only for a short period of time.

Figure 6:
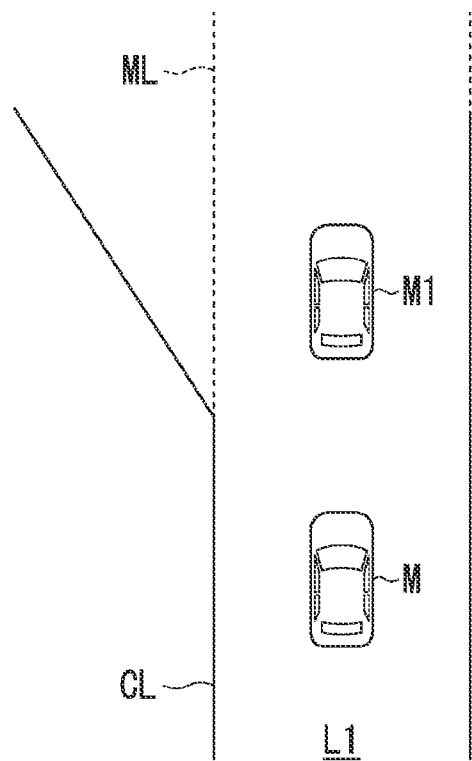
FIG. 6 is a view illustrating another example of a scene in which operation of the vehicle control device according to the embodiment is executed.

FIG. 6 is a view illustrating another example of a scene in which operation of the vehicle control device according to the embodiment is executed. In the scene in FIG. 6, the abnormality judgment unit 152 judges that a discrepancy has occurred in only on one of the camera road demarcation lines CL and the map road demarcation lines ML (that is, in the case in FIG. 6, the road demarcation line on the left side). In this case, the mode determination unit 150 causes the host vehicle M to continue traveling in the driving mode of the mode B while having the road demarcation line on the other side where no discrepancy has occurred (that is, in the case in FIG. 6, the road demarcation line on the right side) as the reference line.

Figure 7:
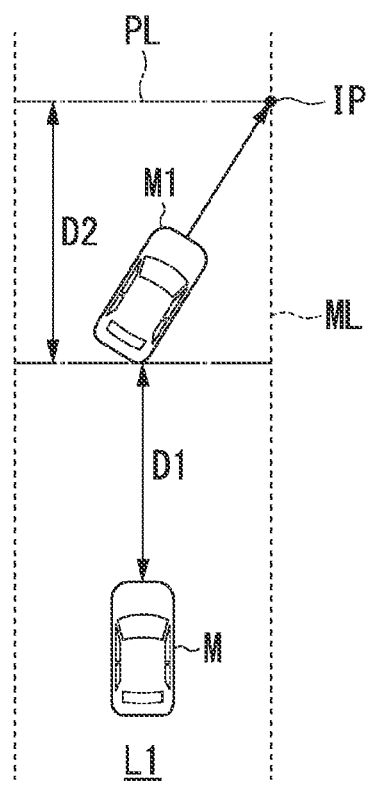
FIG. 7 is a view illustrating another example of a scene in which operation of the vehicle control device according to the embodiment is executed.

FIG. 7 is a view illustrating another example of a scene in which operation of the vehicle control device according to the embodiment is executed. For example, FIG. 7 expresses a circumstance in which both sides of the camera road demarcation lines CL are omitted due to a flaw of the camera 10 and only the map road demarcation lines ML can be normally acquired. At this time, the abnormality judgment unit 152 judges that both sides of the camera road demarcation lines CL are omitted, and the margin calculation unit 154 identifies the intersection point IP between the extended line of the trajectory of the preceding vehicle M1 and the map road demarcation lines ML. Next, the margin calculation unit 154 calculates the margin P using P=(D1+D2)/V [sec] on the basis of the distance D1 from the host vehicle M to the preceding vehicle M1, the distance D2 from the preceding vehicle M1 to the line PL (a line which passes through the intersection point IP and is perpendicular to the camera road demarcation lines CL), and the speed V of the host vehicle M. The mode determination unit 150 causes the host vehicle M to continue traveling in the driving mode of the mode B for the period of time indicated based on the margin P using the map road demarcation lines ML as the reference lines. When the host vehicle M has continued traveling in the driving mode of the mode B for the period of time indicated based on the margin P, the mode determination unit 150 changes the driving mode from the mode B to the mode C, or from the mode C to the mode D or the mode E in stages. Regarding a reason for this, as described above, generally, it is assumed that the reliability of the map road demarcation lines ML is lower than the reliability of the camera road demarcation lines CL. Therefore, it is not preferable to continue automatic driving while having the map road demarcation lines ML as the reference lines.

Figure 8:
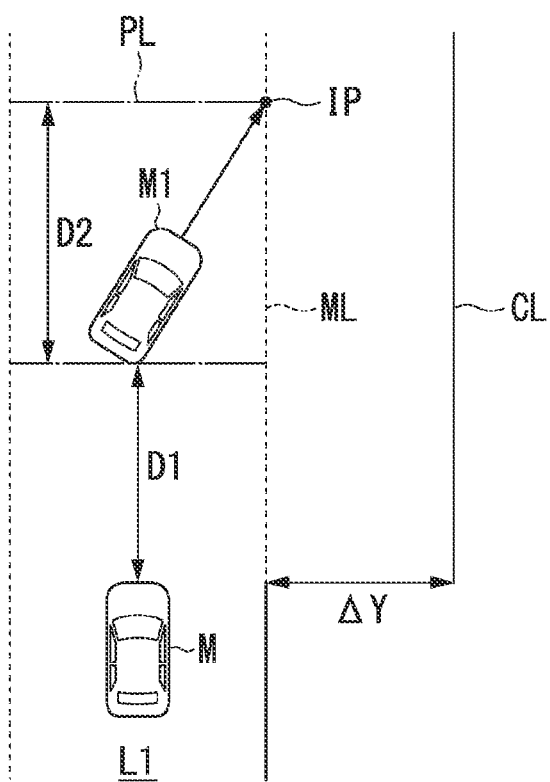
FIG. 8 is a view illustrating another example of a scene in which operation of the vehicle control device according to the embodiment is executed.

FIG. 8 is a view illustrating another example of a scene in which operation of the vehicle control device according to the embodiment is executed. FIG. 8 expresses a case in which one of the camera road demarcation lines CL (that is, the camera road demarcation line CL on the left side) is omitted and misrecognition has occurred in the other of the camera road demarcation lines CL. For example, when the camera road demarcation lines CL are discontinuously shifted in a lateral direction, the abnormality judgment unit 152 judges that misrecognition has occurred in the camera road demarcation lines CL. In the case in FIG. 8, the camera road demarcation line CL on the right side is discontinuously shifted to the right side by ΔY. For this reason, the abnormality judgment unit 152 judges that misrecognition has occurred in the camera road demarcation line CL on the right side.

When the abnormality judgment unit 152 judges that the camera road demarcation line CL on one side is omitted and misrecognition has occurred in the other of the camera road demarcation lines CL, similar to the case in FIG. 7, the margin calculation unit 154 identifies the intersection point IP between the extended line of the trajectory of the preceding vehicle M1 and the map road demarcation lines ML and calculates the margin P. The mode determination unit 150 causes the host vehicle M to continue traveling in the driving mode of the mode B for the period of time indicated based on the margin P using the map road demarcation lines ML as the reference lines. When the host vehicle M has continued traveling in the driving mode of the mode B for the period of time indicated based on the margin P, the mode determination unit 150 changes the driving mode from the mode B to the mode C, or from the mode C to the mode D or the mode E in stages.

Figure 9:
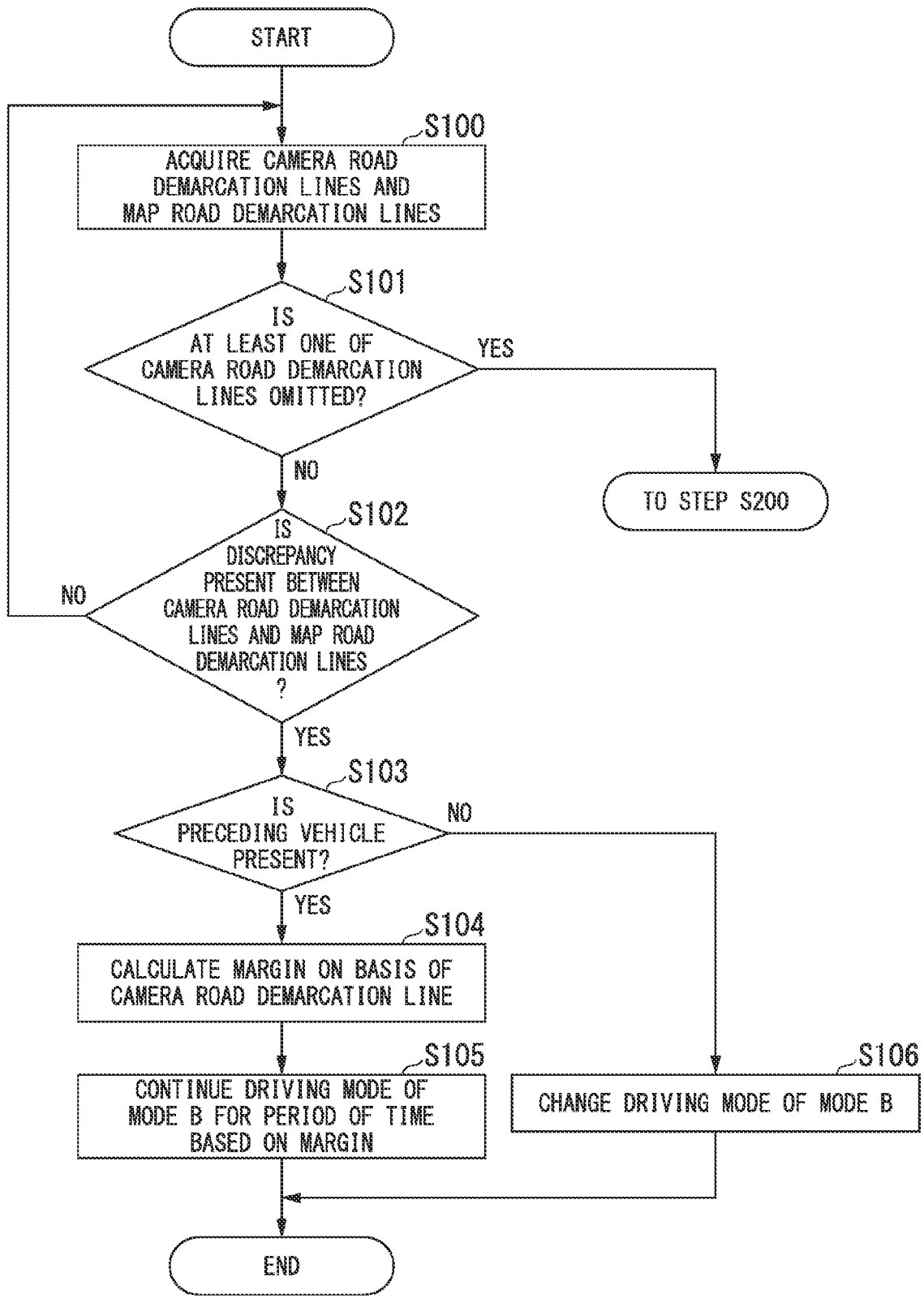
FIG. 9 is a flowchart showing an example of a flow of operation executed by the vehicle control device according to the embodiment.

Next, with reference to FIG. 9, a flow of operation executed by the vehicle control device according to the embodiment will be described. FIG. 9 is a flowchart showing an example of a flow of operation executed by the vehicle control device according to the embodiment. The processing related to this flowchart is executed in a predetermined cycle while the host vehicle M is traveling in the driving mode of the mode B.

First, the mode determination unit 150 acquires the camera road demarcation lines CL and the map road demarcation lines ML via the recognition unit 130 (Step S100). Next, the abnormality judgment unit 152 judges whether or not at least one of the camera road demarcation lines CL is omitted (Step S101).

When it is judged that at least one of the camera road demarcation lines CL is omitted, the processing proceeds to Step S200, which will be described below. On the other hand, when it is not judged that at least one of the camera road demarcation lines CL is omitted, next, the abnormality judgment unit 152 judges whether or not a discrepancy is present between the camera road demarcation lines CL and the map road demarcation lines ML (Step S102).

When it is judged that no discrepancy is present between the camera road demarcation lines CL and the map road demarcation lines ML, the processing returns to Step S100. On the other hand, when it is judged that a discrepancy is present between the camera road demarcation lines CL and the map road demarcation lines ML, next, the abnormality judgment unit 152 judges whether or not the preceding vehicle M1 is present in front of the host vehicle M (Step S103). When it is judged that no preceding vehicle M1 is present in front of the host vehicle M, the mode determination unit 150 changes the driving mode of the mode B to a driving mode imposing heavier tasks (the mode C, the mode D, or the mode E) (Step S106).

On the other hand, when it is judged that the preceding vehicle M1 is present in front of the host vehicle M, the margin calculation unit 154 calculates the margin P on the basis of the distance from the host vehicle M to the preceding vehicle M1, the distance from the preceding vehicle M1 to where the preceding vehicle M1 intersects the camera road demarcation line CL, and the speed of the host vehicle M (Step S104). Next, the mode determination unit 150 causes the host vehicle M to travel in the driving mode of the mode B for the period of time indicated based on the calculated margin P (Step S105). Accordingly, the processing of this flowchart ends.

Figure 10:
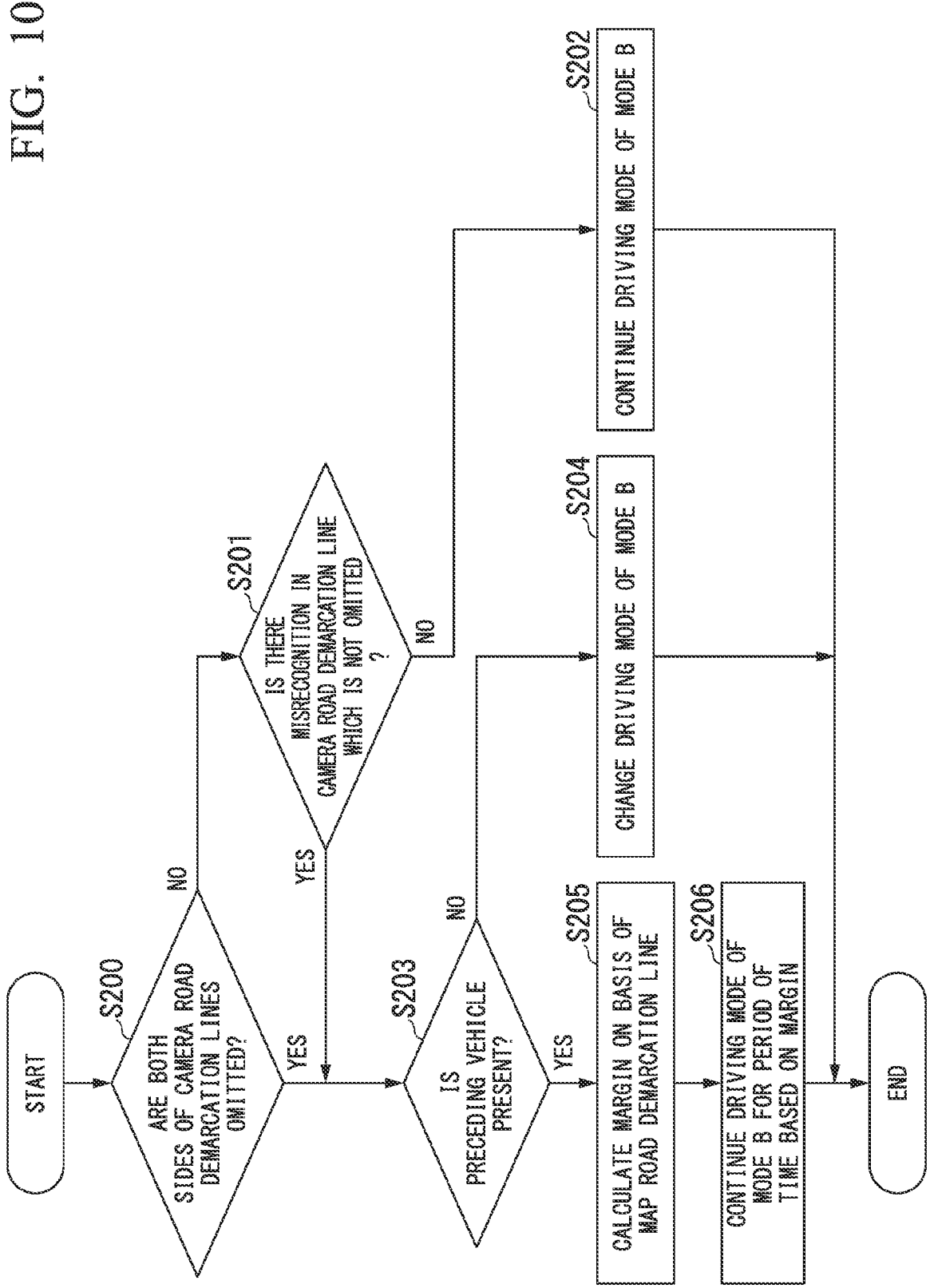
FIG. 10 is a flowchart showing an example of a flow of operation executed by the vehicle control device when camera road demarcation lines have disappeared.

FIG. 10 is a flowchart showing an example of a flow of operation executed by the vehicle control device when the camera road demarcation lines CL are omitted. In Step S101 in FIG. 9, when it is judged that at least one of the camera road demarcation lines CL is omitted, the abnormality judgment unit 152 judges whether or not both sides of the camera road demarcation lines CL are omitted (Step S200). When it is judged that both sides of the camera road demarcation lines CL are not omitted, that is, only one of the camera road demarcation lines CL is omitted, next, the abnormality judgment unit 152 judges whether or not misrecognition has occurred due to occurrence of a discrepancy in the camera road demarcation line CL which is not omitted (Step S201).

When it is judged that misrecognition has not occurred due to occurrence of a discrepancy in the camera road demarcation line CL which is not omitted, the mode determination unit 150 continues the driving mode of the mode B while having the camera road demarcation line CL which is not omitted as the reference line (Step S202). On the other hand, when it is judged that both sides of the camera road demarcation lines CL are omitted or misrecognition has occurred due to occurrence of a discrepancy in the camera road demarcation line CL which is not omitted, next, the abnormality judgment unit 152 judges whether or not the preceding vehicle M1 is present in front of the host vehicle M (Step S203). When it is judged that no preceding vehicle M1 is present in front of the host vehicle M, the mode determination unit 150 changes the driving mode of the mode B to a driving mode imposing heavier tasks (the mode C, the mode D, or the mode E) (Step S204).

On the other hand, when it is judged that the preceding vehicle M1 is present in front of the host vehicle M, the margin calculation unit 154 calculates the margin P on the basis of the distance from the host vehicle M to the preceding vehicle M1, the distance from the preceding vehicle M1 to where the preceding vehicle M1 intersects the map road demarcation line ML, and the speed of the host vehicle M (Step S205). Next, the mode determination unit 150 causes the host vehicle M to travel in the driving mode of the mode B for the period of time indicated based on the calculated margin P (Step S206). Accordingly, the processing of this flowchart ends.

According to the present embodiment described as above, when a discrepancy has occurred between the camera road demarcation lines and the map road demarcation lines and a preceding vehicle is present in front of the host vehicle, a margin for continuing automatic driving is calculated using the position and the speed of the host vehicle, the position of the preceding vehicle, and one of the camera road demarcation lines and the map road demarcation lines, and the host vehicle is caused to continue automatic driving in accordance with the calculated margin. Accordingly, it is possible to flexibly change driving control of a host vehicle even when a road demarcation line recognized using a camera differ from details of map information loaded onto the vehicle.

The embodiment described above can be expressed as follows.

A vehicle control device is constituted to include a storage device which stores a program, and a hardware processor. The hardware processor, by executing the program stored in the storage device, acquires a camera image obtained by capturing an image of surrounding circumstances of a vehicle; controls steering and acceleration/deceleration of the vehicle without depending on an operation of a driver of the vehicle on the basis of the camera image and map information; determines any of a plurality of driving modes including a first driving mode and a second driving mode as a driving mode of the vehicle, and changes the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle; judges whether or not a discrepancy is present between road demarcation lines indicated in the camera image and road demarcation lines indicated in the map information, and judges whether or not a preceding vehicle is present in front of the vehicle when it is judged that the discrepancy is present; calculates, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle;

and causes the vehicle to continue traveling in the second driving mode for a period of time indicated based on the margin.

Hereinabove, a form for performing the present invention has been described using the embodiment. However, the present invention is not limited to such an embodiment at all, and various modifications and replacements can be added within a range not departing from the gist of the present invention.

What is claimed is:

1. A vehicle control device comprising:
a storage medium which stores a command able to be read by a computer; and
at least one processor which is connected to the storage medium,
wherein at least the one processor, by executing the command able to be read by the computer,
acquires a camera image obtained by capturing an image of surrounding circumstances of a vehicle;
controls steering and acceleration/deceleration of the vehicle without depending on an operation of a driver of the vehicle on the basis of the camera image and pre-stored map information relating to boundaries of lanes;
determines any of a plurality of driving modes including a first driving mode and a second driving mode as a driving mode of the vehicle, and changes the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle;
judges whether or not an abnormality has occurred in road demarcation lines indicated in the camera image or road demarcation lines indicated in the map information, and judges whether or not a preceding vehicle is present in front of the vehicle when it is judged that the abnormality has occurred;
calculates, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle; and
causes the vehicle to continue traveling in the second driving mode for a period of time indicated based on the margin,
wherein the at least one processor calculates the margin by adding the distance from the vehicle to the preceding vehicle and the distance from the preceding vehicle to where the preceding vehicle intersects the road demarcation line, and dividing the distance from the vehicle to the preceding vehicle and the distance from the preceding vehicle to where the preceding vehicle intersects the road demarcation line by the speed of the vehicle.

2. The vehicle control device according to claim 1, wherein when it is judged as the abnormality that a discrepancy is present on both sides of the road demarcation lines indicated in the camera image and the road demarcation lines indicated in the map information, at least the one processor causes traveling in the second driving mode to continue for the period of time indicated based on the margin and changes the second driving mode to the first driving mode after the period of time has elapsed using the road demarcation lines indicated in the camera image as reference lines.

3. The vehicle control device according to claim 1, wherein when it is judged as the abnormality that a discrepancy is present on both sides of the road demarcation lines indicated in the camera image and the road demarcation lines indicated in the map information, at least the one processor judges whether or not a state in which the road demarcation lines on both sides indicated in the camera image are discrepant from the road demarcation lines on both sides indicated in the map information at the same angle and a curvature change rate equal to or larger than a threshold continues for a predetermined period of time,
wherein when it is judged that the state continues for the predetermined period of time, it is judged that there is misrecognition in the road demarcation lines indicated in the camera image, and
wherein when it is judged that there is misrecognition in the road demarcation lines indicated in the camera image, the second driving mode is changed to the first driving mode using the road demarcation lines indicated in the map information.

4. The vehicle control device according to claim 1, wherein when it is judged as the abnormality that a discrepancy is present on only one of the road demarcation lines indicated in the camera image and the road demarcation lines indicated in the map information, at least the one processor causes traveling in the second driving mode to continue using the road demarcation line in which the discrepancy has not occurred as a reference line.

5. The vehicle control device according to claim 1, wherein when it is judged as the abnormality that both sides of the road demarcation lines indicated in the camera image have disappeared, at least the one processor causes traveling in the second driving mode to continue for the period of time indicated based on the margin and changes the second driving mode to manual driving in stages via the first driving mode after the period of time has elapsed using the road demarcation lines indicated in the map information as reference lines.

6. The vehicle control device according to claim 1, wherein when it is judged as the abnormality that misrecognition has occurred due to disappearance of one of the road demarcation lines indicated in the camera image and a discrepancy in the other of the road demarcation lines indicated in the camera image, at least the one processor causes traveling in the second driving mode to continue for the period of time indicated based on the margin and changes the second driving mode to manual driving in stages via the first driving mode after the period of time has elapsed using the road demarcation lines indicated in the map information as reference lines.

7. The vehicle control device according to claim 1,
wherein the second driving mode is a driving mode in which a task of grasping an operation piece receiving a steering operation of the vehicle is not imposed on the driver, and
wherein the first driving mode is a driving mode in which at least only the task of grasping the operation piece is imposed on the driver.

8. A vehicle control method,
wherein a computer
acquires a camera image obtained by capturing an image of surrounding circumstances of a vehicle;
controls steering and acceleration/deceleration of the vehicle without depending on an operation of a driver of the vehicle on the basis of the camera image and map information;
determines any of a plurality of driving modes including a first driving mode and a second driving mode as a driving mode of the vehicle, and changes the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle;
judges whether or not an abnormality has occurred in road demarcation lines indicated in the camera image or road demarcation lines indicated in the map information, and judges whether or not a preceding vehicle is present in front of the vehicle when it is judged that the abnormality has occurred;
calculates, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle; and
causes the vehicle to continue traveling in the second driving mode for a period of time indicated based on the margin,
wherein the computer calculates the margin by adding the distance from the vehicle to the preceding vehicle and the distance from the preceding vehicle to where the preceding vehicle intersects the road demarcation line, and dividing the distance from the vehicle to the preceding vehicle and the distance from the preceding vehicle to where the preceding vehicle intersects the road demarcation line by the speed of the vehicle.

9. A computer readable non-transitory storage medium storing a program for causing a computer
to acquire a camera image obtained by capturing an image of surrounding circumstances of a vehicle;
to control steering and acceleration/deceleration of the vehicle without depending on an operation of a driver of the vehicle on the basis of the camera image and map information;
to determine any of a plurality of driving modes including a first driving mode and a second driving mode as a driving mode of the vehicle, and change the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle;
to judge whether or not an abnormality has occurred in road demarcation lines indicated in the camera image or road demarcation lines indicated in the map information, and judge whether or not a preceding vehicle is present in front of the vehicle when it is judged that the abnormality has occurred;
to calculate, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle; and
to cause the vehicle to continue traveling in the second driving mode for a period of time indicated based on the margin,
wherein the computer calculates the margin by adding the distance from the vehicle to the preceding vehicle and the distance from the preceding vehicle to where the preceding vehicle intersects the road demarcation line, and dividing the distance from the vehicle to the preceding vehicle and the distance from the preceding vehicle to where the preceding vehicle intersects the road demarcation line by the speed of the vehicle.

10. A vehicle control device comprising:
a storage medium which stores a command able to be read by a computer; and
at least one processor which is connected to the storage medium,
wherein at least the one processor, by executing the command able to be read by the computer,
acquires a camera image obtained by capturing an image of surrounding circumstances of a vehicle;
controls steering and acceleration/deceleration of the vehicle without depending on an operation of a driver of the vehicle on the basis of the camera image and pre-stored map information relating to boundaries of lanes;
determines any of a plurality of driving modes including a first driving mode and a second driving mode as a driving mode of the vehicle, and changes the driving mode of the vehicle to a driving mode imposing heavier tasks when tasks related to the determined driving mode are not being executed by the driver, the second driving mode being a driving mode in which tasks imposed on the driver are lighter than in the first driving mode, some of the plurality of driving modes including at least the second driving mode being performed by controlling steering and acceleration/deceleration of the vehicle without depending on an operation of the driver of the vehicle;
judges whether or not an abnormality has occurred in road demarcation lines indicated in the camera image or road demarcation lines indicated in the map information, and judges whether or not a preceding vehicle is present in front of the vehicle when it is judged that the abnormality has occurred;
calculates, when it is judged that the preceding vehicle is present, a margin for the vehicle to continue traveling in the second driving mode on the basis of a distance from the vehicle to the preceding vehicle, a distance from the preceding vehicle to where the preceding vehicle intersects a road demarcation line indicated in the camera image or a road demarcation line indicated in the map information, and a speed of the vehicle; and
causes the vehicle to continue traveling in the second driving mode for a period of time indicated based on the margin,
wherein when it is judged that the abnormality involves disappearance of at least one of the road demarcation lines indicated in the camera image, at least the one processor calculates the margin on the basis of the distance from the preceding vehicle to where the preceding vehicle intersects the road demarcation line indicated in the map information, or when it is judged that the abnormality does not involve disappearance of at least one of the road demarcation line indicated in the camera image, the at least one processor calculates the margin on the basis of the distance from the preceding vehicle to where the preceding vehicle intersects the road demarcation line indicated in the camera image.

* * * * *